United States Patent Office 2,805,220
Patented Sept. 3, 1957

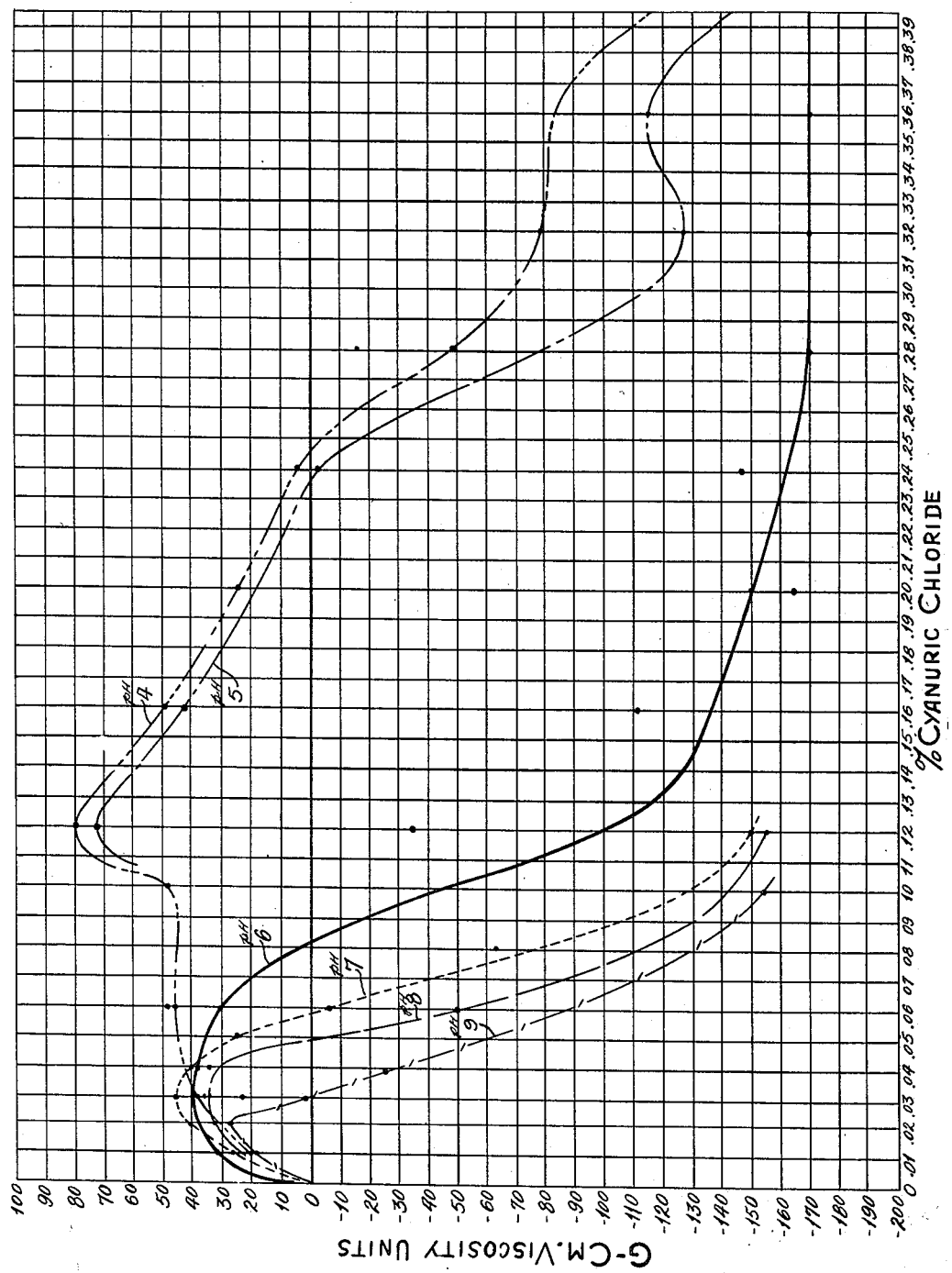

2,805,220
HIGH VISCOSITY AND INSOLUBLE STARCH PRODUCTS AND METHOD FOR PRODUCING SAME

Thomas S. W. Gerwitz, St. Louis, Mo., assignor to Anheuser-Busch, Incorporated, St. Louis, Mo., a corporation of Missouri Application August 16, 1954, Serial No. 449,945

14 Claims. (Cl. 260—233.3)

The present invention relates generally to starch derivatives, and more particularly to a novel high viscosity water soluble starch product and an insoluble starch product, and to a novel method for producing them from unmodified starch. Specifically, the present invention pertains to a thick-thick boiling starch and an insoluble starch prepared from unmodified starch using cyanuric chloride as the principal reactant.

So-called thin boiling starches, thick boiling starches and thick-thick boiling starches are used in the paper, textile, confectionery and rubber industries. The principal difference between a thick-thick boiling starch and the others is that its solutions are more viscous.

It is an object of the present invention to provide a novel thick-thick boiling starch and a novel method of producing it from unmodified starch using a relatively small amount of reactant. More particularly it is an object to provide a thick-thick boiling starch which is maintained at a substantially constant viscosity during long periods of cooking, and a novel method for producing it from unmodified starch (such as obtained from corn) utilizing a highly-active, tri-functional esterifying reactant which is capable of forming cross bonds between the hydroxyl groups of the starch molecules. Specifically, it is an object to provide a novel thick-thick boiling starch and a method for producing it from unmodified starch, employing cyanuric chloride which has three so-called "active centers" whereby each cyanuric chloride molecule can theoretically bond together three hydroxyl groups from the same or different starch molecules.

Yet another object is to provide a novel method utilizing cyanuric chloride for producing a starch which is non-swelling or insoluble when cooked at a temperature of 92° C., and which is preferably insoluble at higher temperatures, whereby it is suitable for use as a surgical dusting starch.

Briefly, the present invention comprises reacting a relatively small amount of cyanuric chloride with unmodified starch (as obtained from corn) under controlled conditions of pH (and to a lesser extent, time) to produce a water soluble thick-thick boiling starch in which preferably all three so-called "active centers" of each cyanuric chloride molecule react with the hydroxyl groups of the starch molecules. By using additional amounts of cyanuric chloride, or by increasing the time of reaction or the pH, an insoluble or non-swelling starch product is produced.

In following the teachings of the present invention, a starch slurry, i. e. unmodified corn starch granules and water, at a temperature of about 115° F. and with a viscosity of about 23° Bé., has a base or acid added to it to adjust the pH thereof to preferably between about 3 to 10. The starting pH of the slurry is usually in the neighborhood of about 3–5 and will depend upon the source of the corn, the time of the year, and conditions in the plant which produces the slurry. Any base or acid may be used which will adjust the pH to a suitable level, such as trisodium phosphate ($Na_3PO_4$), sodium carbonate ($NaCO_3$), hydrogen chloride (HCl), or the like. It should be borne in mind that the base or acid is not used to "modify" the starch, but to adjust the pH of the slurry prior to the addition of the reactant. The density of the slurry is not unduly critical and can range from about 10° to about 25° Baumé; from 20°–24° Baumé is the preferred range because of the commercial equipment usually available.

After the pH of the slurry has been adjusted, a quantity of the reactant, cyanuric chloride, is added either in the dry form or in a suitable solvent such as acetone. One of the important features of the present invention is the exceptional and suprisingly high reactivity of cyanuric chloride with unmodified starch, whereby only a relatively small amount of the reactant is required to obtain a suitable thick-thick boiling starch or an insoluble starch.

The mixture is then allowed to react at a selected pH for a controlled time sufficient for the hydroxyl groups of the starch molecules to be cross bonded through the three so-called "active centers" of each cyanuric chloride molecule.

Although cyanuric chloride reacts with water, it appears that in the instant process, relatively few of the chlorine atoms in the cyanuric chloride molecule are displaced by hydroxyl groups from the water.

The reaction between the starch and the cyanuric chloride proceeds at a pH of between about 2 to 10, but at different rates and with different results. Several other variables may be manipulated or controlled to increase the amount of reaction and the type of resultant product, including: the concentration of cyanuric chloride, the concentration of starch, the time of reaction, and the temperature of reaction. The most sensitive of these appear to be pH, concentration of cyanuric chloride, and time of reaction—in the order stated. It has been determined that the time of reaction is not too critical, especially when the pH value is relatively low, i. e., for example, 8 and below, and can range anywhere from about 5 minutes to as long as 12 hours, and possibly longer. The temperature during the reaction period is also not unduly critical and can range from between about 32° and about 130° F. although the preferred range is in the neighborhood of about 90–130° F.

By controlling the main variables, a starch can be produced, which, upon cooking, provides a relatively low viscosity thick boiling starch, or a relatively high viscosity thick-thick boiling starch; or, a starch can be produced which is non-swelling or insoluble when cooked at 92° C. For example, if a relatively very small amount of reactant is used, the resultant product produces a thick boiling starch of low viscosity. If the amount of reactant is increased, a relatively high viscosity thick-thick boiling starch results. If more reactant is used, a relatively low viscosity starch results, and if even more reactant is used, there is produced a non-swelling or insoluble starch.

It is suspected that as the amount of cyanuric chloride used is increased (or the time of reaction, or the temperature is increased), the aggregates produced by the cross bonding of the cyanuric chloride molecules and the starch molecules increase in size, and help to produce a more viscous starch. However, when one or more of these variables is increased beyond a certain limit, the cross-bonded molecules reach a size such that their solubility in water is decreased, and the viscosity decreases. Then, when one or more of the variables is further increased, the aforementioned masses or cross-bonded molecules may approach such large size that they are completely insoluble and the resultant product will not dissolve in boiling water.

After the reaction, the resultant product can be diluted with water to approximately 15 degrees Baumé, filtered, dried and packaged.

In order to illustrate the effect on the viscosity of the resultant starch product of various amounts of cyanuric chloride and different pH values, a series of runs were made with pH values of from 3 to 9, and with from .01% to .30%, by weight, of cyanuric chloride.

In each of the runs, a corn starch slurry of about 23° Bé. and about 115° F. was provided and a basic or acid solution added thereto to adjust the pH to the selected level. A predetermined quantity of cyanuric chloride was then introduced into the slurry. As the cyanuric chloride was mixed therein, a reaction occurred which caused the pH level to drop and the pH was then returned to the selected level by the addition of a basic solution, such as 2% sodium carbonate solution.

At the end of the selected reaction period, the starch solution was diluted to about 12° Bé. and the pH value adjusted to about 5 or below by the addition of 2% hydrochloric acid or 2% sodium carbonate solution, and the reaction permitted to continue for about one hour. This additional hour at the adjusted pH level is about the average holding time in the plant operation prior to filtering, washing, and drying the finished starch product.

It is well known that the viscosity of different batches of unmodified pearl starch, when cooked, is not uniform, primarily because of the variations in the characteristics of the corn used in producing it, and the conditions of manufacture. Therefore, it was necessary to use a "control" starch of determined viscosity to measure the change in viscosity caused in the modified starch by varying the pH level and the quantity of reactant. Consequently, the changes in viscosity relative to the viscosity of the "control" unmodified starch, measured in gram centimeters, are the values tabulated below (Exhibit 1) and plotted on the graph, Fig. 1. In measuring the viscosities of both the unmodified "control" starches and the modified or treated starches, a Corn Industries Research Foundation Viscometer was used.

*Exhibit No. 1* pH 3

| Percent $C_3N_3Cl_3$ | Increase in Viscosity in gram centimeters |
|---|---|
| .01 | 13 |
| .02 | 18 |
| .03 | 23 |
| .04 | 22 |
| .06 | 37 |
| .08 | 45 |
| .10 | 43 |
| .12 | 50 |
| .16 | 33 |
| .20 | 18 |
| .24 | −7 |
| .28 | −62 |
| .32 | −87 |
| .36 | −103 |
| .40 | −147 | pH 4

| .01 | 19 |
|---|---|
| .03 | 38 |
| .06 | 46 |
| .10 | 48 |
| .12 | 79 |
| .16 | 49 |
| .20 | 24 |
| .24 | 4 |
| .28 | −49 |
| .32 | −79 |
| .36 | −84 |
| .40 | −125 | pH 5

| .01 | 53 |
|---|---|
| .03 | 36 |
| .06 | 47 |
| .10 | 48 |
| .12 | 72 |
| .16 | 42 |
| .20 | 24 |
| .24 | −2 |
| .28 | +7 |
| .32 | −127 |
| .36 | −115 |
| .40 | −150 | pH 6

| Percent $C_3N_3Cl_3$ | Increase in Viscosity in gram centimeters |
|---|---|
| .01 | 31 |
| .03 | 23 |
| .04 | 38 |
| .06 | 30 |
| .08 | −63 |
| .12 | −155 |
| .12 | −35 |
| .16 | −111 |
| .20 | −165 |
| .24 | −147 |
| .28 | −170 |
| .32 | −170 |
| .36 | −170 |
| .40 | −170 | pH 7

| .01 | 28 |
|---|---|
| .02 | 40 |
| .03 | 45 |
| .04 | 40 |
| .05 | 23 |
| .06 | −7 |
| .12 | −150 |
| .20 | −150 | pH 8

| .01 | 15 |
|---|---|
| .02 | 32 |
| .03 | 35 |
| .04 | 35 |
| .06 | −50 |
| .12 | −155 | pH 9

| .01 | 20 |
|---|---|
| .02 | 28 |
| .03 | 2 |
| .04 | −26 |
| .10 | −155 |

Considering the tabulation (Exhibit 1) and the graph, it will be noted that all of the runs in which the pH value was maintained at 5 or below follow the same general pattern, i. e., the viscosity increased gradually as the amount of cyanuric chloride was increased up to about .12%, and thereafter, the viscosity gradually decreased as the amount of cyanuric chloride was increased. The viscosity readings at .12% and above may be a little high because of inaccuracies in the viscometer, but they accurately show the trend.

In like manner, it will be noted that all of the runs in which the pH was maintained at a value of 6 or above, follow the same general pattern, viz., a gradual increase in viscosity when about .02% to .04% cyanuric chloride was used, and then a relatively sharp decrease as the amount of cyanuric chloride was increased.

From the present disclosure, it is apparent that in order to produce a boiled starch of relatively high viscosity, i. e., a so-called thick-thick boiling starch, without having to closely control the amount of reactant used or the time of reaction, it is advisable to maintain the pH value at 5 or below. Furthermore, if we assume that a desirable thick-thick boiling starch is one in which the viscosity has been increased more than about 20 gram centimeters relative to the "control" starch, the pH value should be maintained at 5 or below, and the quantity of cyanuric chloride used should be between about .01% to about .21%, by weight, or more particularly between about .10% and about .16%. If the maximum viscosity is desired, the amount of cyanuric chloride used should be in the neighborhood of about .12%.

Manifestly, the amount of cyanuric chloride which is used will depend on its cost and the advantages of having a starch of relatively higher viscosity. At higher pH values less cyanuric chloride is needed to give the same resulting product, but there is more danger of too extensive a reaction. Thus, if the amount of reactant used and the time of reaction can be closely controlled, the most economical runs are at pH's of 7, 8 or 9 with an amount of reactant in the neighborhood of .03%. Specifically at a pH of 7, the amount of reactant should be between about .01% to about .05%; at a pH of 8, the amount should be between about .01% to about .045%; and for a pH of 9, it should be between about .01% to about .025%.

If it is desired to produce an insoluble or non-swelling starch which will not gelatinize when cooked at 100° C., and it is assumed that such a starch is produced when the decrease in viscosity, relative to the "control" starch is about —140 gram centimeters, it is advisable to maintain the pH value at 6 or above, but below 11, and add between about .09% to about .22% cyanuric chloride, by weight, and in any event, not less than about .07% cyanuric chloride.

In producing an insoluble starch, it is advisable to prevent the pH value from increasing above 10, otherwise, there is a possibility that the starch may become gelatinized during the modification process.

Thus, it is apparent that there have been provided novel thick-thick boiling starches and insoluble or non-swelling starches and a novel method for producing them, which fulfill all of the objects and advantages sought therefor.

Cyanuric chloride has an exceptional and surprisingly high reactivity with unmodified starch in solution so that only a relatively very small amount is necessary to produce either a thicker boiling starch, a thick-thick boiling starch, or an insoluble or non-swelling starch.

By maintaining the pH value of the slurry below a predetermined value, and adding selected amounts of cyanuric chloride thereto, modified starches are produced, which, upon being cooked, provide thick-thick boiling starches of relatively high viscosity which are maintained at a substantially uniform high viscosity over long periods of cooking time.

Also, by maintaining the pH value of the slurry above a predetermined value, and adding more than a minimum amount of cyanuric chloride thereto, a starch product is produced which is insoluble or non-swelling when cooked at 92° C., and which is likely to remain insoluble and non-swelling at even higher temperatures.

It is to be understood that the foregoing descriptions have been given only by way of illustration and example, and that changes and alterations in the present disclosure, which will be readily apparent to one skilled in the art, are contemplated as within the scope of the present invention, which is limited only by the claims which follow.

What is claimed is:

1. The process of producing a starch which, when cooked, provides a dispersion of desired viscosity, including the steps of providing a starch slurry at a temperature of between about 32° F. and about 140° F.; adding thereto a quantity of cyanuric chloride; and maintaining the pH of the slurry at a selected value between about 2 and about 10 during the reaction period.

2. The process of producing a starch which, when cooked, provides a dispersion of desired viscosity, including the steps of providing a starch slurry at a temperature of between about 32° F. and about 140° F.; adding thereto a quantity of cyanuric chloride; and maintaining the pH of the slurry at a selected value between about 5 and about 2 during the reaction period.

3. The process for producing an insoluble starch, including the steps of providing a starch slurry at a temperature of between about 32° F. and about 140° F.; adding thereto a quantity of cyanuric chloride; and maintaining the pH of the slurry between about 6 and about 10 during the reaction period.

4. The process for producing a starch which, when cooked, provides a dispersion of relatively high viscosity, including the steps of providing a starch slurry at a temperature of between about 32° F. and about 140° F.; adding thereto between about .01% to about .21%, by weight, of cyanuric chloride; and maintaining the pH of the slurry at a selected value between about 2 and about 10 during the reaction period.

5. The process for producing a starch which, when cooked, provides a dispersion of relatively high viscosity, including the steps of providing a starch slurry at a temperature of between about 32° F. and about 140° F.; adding thereto between about .10% to about .16%, by weight, of cyanuric chloride; and maintaining the pH of the slurry at a selected value between about 2 and about 5 during the reaction period.

6. The process for producing a starch which which, when cooked, provides a dispersion of relatively high viscosity, including the steps of providing a starch slurry at a temperature of between about 32° F. and about 140° F.; adding thereto about .12%, by weight, of cyanuric chloride; and maintaining the pH of the slurry at a selected value between about 2 and about 5 during the reaction period.

7. The process for producing a starch which, when cooked, provides a dispersion of relatively high viscosity, including the steps of providing a starch slurry at a temperature of between about 32° F. and about 140° F.; adding thereto no more than about .21% by weight, of cyanuric chloride; and maintaining the pH of the slurry at a selected value between about 2 and about 5 during the reaction period.

8. The process for producing an insoluble starch, including the steps of providing a starch slurry at a temperature of between about 32° F. and about 140° F.; adding thereto at least about .07%, by weight, of cyanuric chloride; and maintaining the pH of the slurry at a selected value between about 6 and about 10 during the reaction period.

9. A high viscosity starch product produced by reacting cyanuric chloride with a starch slurry maintained at a pH between about 2 and about 5.

10. An insoluble starch product produced by reacting cyanuric chloride with a starch slurry maintained at a pH between about 6 and about 10.

11. The process of producing a starch which, when cooked, provides a dispersion of desired viscosity, including the steps of providing a starch slurry at a temperature of between about 32° F. and about 140° F. and a density between about 10° to about 25° Baumé; adding thereto between about .01% to about .05%, by weight, of cyanuric chloride; and maintaining the pH of the slurry at about 7 during the reaction period.

12. The process of producing a starch which, when cooked, provides a dispersion of desired viscosity, including the steps of providing a starch slurry at a temperature of between about 32° F. and about 140° F. and a density between about 10° to about 25° Baumé; adding thereto between about .01% to about .045%, by weight, of cyanuric chloride; and maintaining the pH of the slurry at about 8 during the reaction period.

13. The process of producing a starch which, when cooked, provides a dispersion of desired viscosity, including the steps of providing a starch slurry at a temperature of between about 32° F. and about 140° F. and a density between about 10° to about 25° Baumé; adding thereto between about .01% to about .025%, by weight of cyanuric chloride; and maintaining the pH of the slurry at about 9 during the reaction period.

14. The process of producing a starch which, when cooked, provides a dispersion of desired viscosity, including the steps of providing a starch slurry at a temperature of between about 32° F. and about 140° F. and a density between about 10° to about 25° Baumé; adding thereto between about .005% to about .07%, by weight, of cyanuric chloride; and maintaining the pH of the slurry at about 6 during the reaction period.

References Cited in the file of this patent
UNITED STATES PATENTS

| | | |
|---|---|---|
| 2,108,862 | Kerr | Feb. 22, 1938 |
| 2,282,364 | Kunze | May 12, 1942 |
| 2,284,896 | Hanford | June 2, 1942 |
| 2,317,752 | Fuller | Apr. 27, 1943 |
| 2,328,537 | Felton et al. | Sept. 7, 1943 |
| 2,392,359 | Borghn | Jan. 8, 1946 |
| 2,566,842 | Landes | Sept. 4, 1951 |
| 2,566,861 | Studeny | Sept. 4, 1951 |
| 2,668,169 | Wolff | Feb. 2, 1954 |